United States Patent
Yamaguchi et al.

[11] Patent Number: 5,541,843
[45] Date of Patent: Jul. 30, 1996

[54] ENGINE OUTPUT CONTROL DEVICE FOR VEHICLES

[75] Inventors: Susumu Yamaguchi; Hiroshi Koyama, both of Higashimatsuyama; Hiroyuki Kurita, Ageo, all of Japan

[73] Assignees: Zexel Corporation, Tokyo; Nissan Diesel Motor Co., Ltd., Saitama, both of Japan

[21] Appl. No.: 171,710

[22] Filed: Dec. 22, 1993

[30] Foreign Application Priority Data

Dec. 25, 1992 [JP] Japan .................................. 4-359334

[51] Int. Cl.⁶ .................................................. B60K 31/02
[52] U.S. Cl. ............................ 364/426.02; 364/426.04; 180/197; 180/179
[58] Field of Search .................. 364/426.02, 426.03, 364/426.04; 180/197, 170, 178, 179; 123/361, 352

[56] References Cited

U.S. PATENT DOCUMENTS

| | | | |
|---|---|---|---|
| 4,953,093 | 8/1990 | Etoh | 364/426.03 |
| 5,019,986 | 5/1991 | Londt et al. | 364/426.04 |
| 5,107,948 | 4/1992 | Yamamoto | 364/426.02 |
| 5,400,865 | 3/1995 | Togai et al. | 364/426.04 |

*Primary Examiner*—Gary Chin
*Attorney, Agent, or Firm*—Wenderoth, Lind & Ponack

[57] ABSTRACT

An engine output control device executes control while also executing auto cruise control if traction control is executed during auto cruise running so that traction control and auto cruise control are established at the same time. If the traction control executed by a traction controller and the auto cruise runs, executed by an auto cruise controller, are established at the same time, then the auto cruise controller is released and, at the same time an accelerator signal (auto cruise accelerator signal), which is pseudo controlled by the speed during the running of the auto cruise, is calculated by a pseudo control accelerator signal calculation, and because traction control is executed for the auto cruise accelerator signal, the auto cruise control is restored. Consequently it is possible to execute auto cruise control continuously.

5 Claims, 4 Drawing Sheets

ENGINE OUTPUT CONTROL DEVICE FOR VEHICLES

BACKGROUND OF THE INVENTION

1. Field of the Invention

The present invention relates to an engine output control device for vehicles that controls the engine output by controlling the position of the rack in the fuel injection system.

2. Related Art

The traction control systems provided in vehicles today detect the amount of slippage between the drive wheel and the slave wheel and if the amount of slippage detected exceeds a specified value, the traction control system acts to reduce engine output. At the same time, the auto cruise control adjusts the engine output in order to maintain a preset target vehicle speed.

In other words, while the traction control is required to reduce engine output, the auto cruise control is required, at the same time, to increase engine output when the speed of the vehicle decreases. This means the two systems are sometimes at crossed purposes.

For this reason, in the engine output control devices for vehicles disclosed in Japanese Unexamined Patent Publication No. 3-153426 and Japanese Unexamined Patent Publication No. 3-81541, traction control is executed with priority whenever traction control and auto cruise control are established at the same time.

Also, a method is disclosed in Japanese Unexamined Patent Publication No. 2-201036, whereby a throttle-by-wire control system, a traction control system and an auto cruise control system are integrated to maintain a target engine output torque, this being the common element among those controls, and to select an optimum target engine output torque for each of the various operating modes.

However, with the devices disclosed in Japanese Unexamined Patent Publication No. 3-153426 and Japanese Unexamined Patent Publication No. 3-81541, when traction control is executed and auto cruise control is released, the auto cruise control execution must be re-established when traction control is released. When the vehicle is traveling on a highway and traction control is being executed frequently, re-establishing auto cruise control each time becomes a problem. There is also the problem that during the execution of traction control, auto cruise control cannot be selected.

SUMMARY OF THE INVENTION

The objective of the present invention is to provide an engine output control device for vehicles wherein; when traction control is executed during auto cruise running in such a manner that traction control and auto cruise control are established at the same time, traction control can be executed at the same time as auto cruise control.

In order to achieve this objective, an engine output control device for vehicles in accordance with the present invention is provided and comprises: a traction control system that detects the amount of slippage the vehicle experiences and inhibits engine output by adjusting the position of the rack in the fuel injection system using the accelerator signal that corresponds to the accelerator pedal input; an auto cruise control system, which sets a target vehicle speed and also adjusts the position of the aforementioned rack in order to maintain that speed; pseudo-control accelerator signal calculator that calculates the auto cruise accelerator signal, controlled by, at least, the rotational speed of the engine and the actual position of the rack for auto cruise running; a controller that releases the auto cruise control when traction control is established during auto cruise running, and which also executes traction control in accordance with the auto cruise accelerator signal that is calculated by the aforementioned pseudo controller accelerator signal calculation and which, at the same time, recovers auto cruise control when the traction control ends.

In the present invention, therefore, since traction control is executed during auto cruise running (during the execution of auto cruise control), auto cruise control is released when auto cruise control and traction control are established at the same time. The accelerator signal, (auto cruise control accelerator signal) which is controlled by the speed during an auto cruise run, is calculated by a means of a pseudo control accelerator signal calculation and traction control is executed in accordance with this auto cruise accelerator signal. It is therefore possible to maintain an apparent auto cruise control state and also, when the traction control ends, to recover the auto cruise control. Consequently, it is possible to execute auto cruise control virtually continuously.

DETAILED DESCRIPTION OF THE PREFERRED EMBODIMENT

Figure 1:
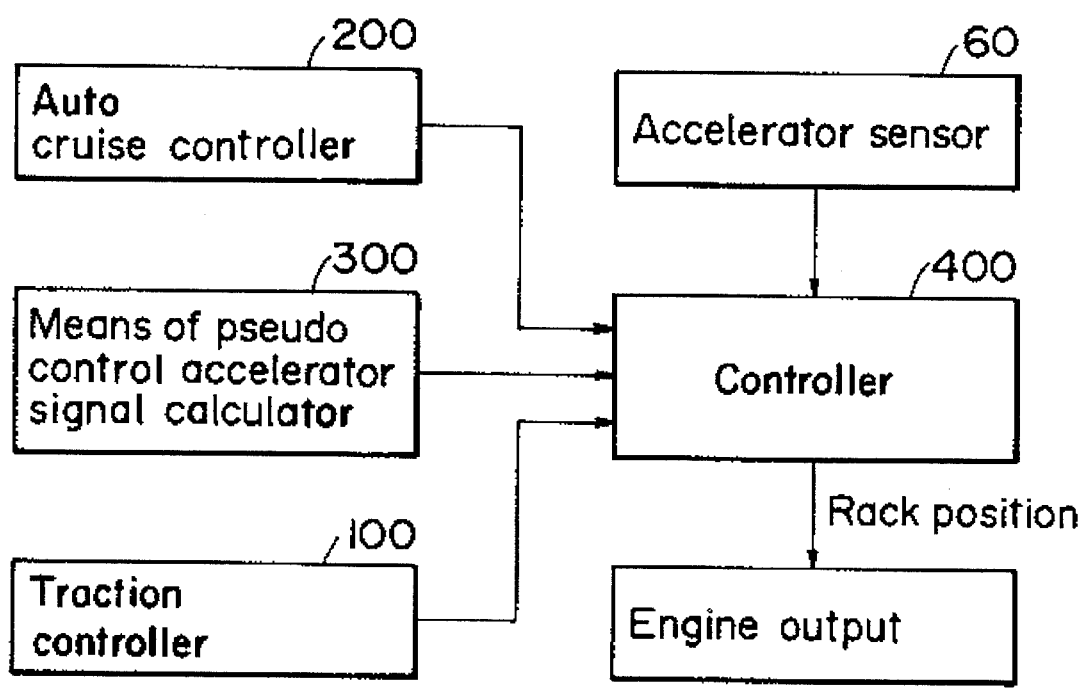
FIG. 1 is a block diagram that illustrates the basic structure of the present invention.

The following is an explanation of the present invention in reference to the drawings. As shown with FIG. 1, the engine output control device according to the present invention comprises, at least, a traction controller 100, an auto cruise controller 200, a pseudo control accelerator signal calculator 300, a controller 400 and an accelerator sensor 60 that detects the operating input of the accelerator pedal. The system controls the engine output by changing the position of the rack in the fuel injection system (not shown). A target rack position is set, and the actual position of the rack is adjusted to match this target position, which in turn rotates the plunger through the control pinion and the control sleeve to adjust the quantity of fuel injected by shifting the positions of the cylinder and plunger.

Figure 2:
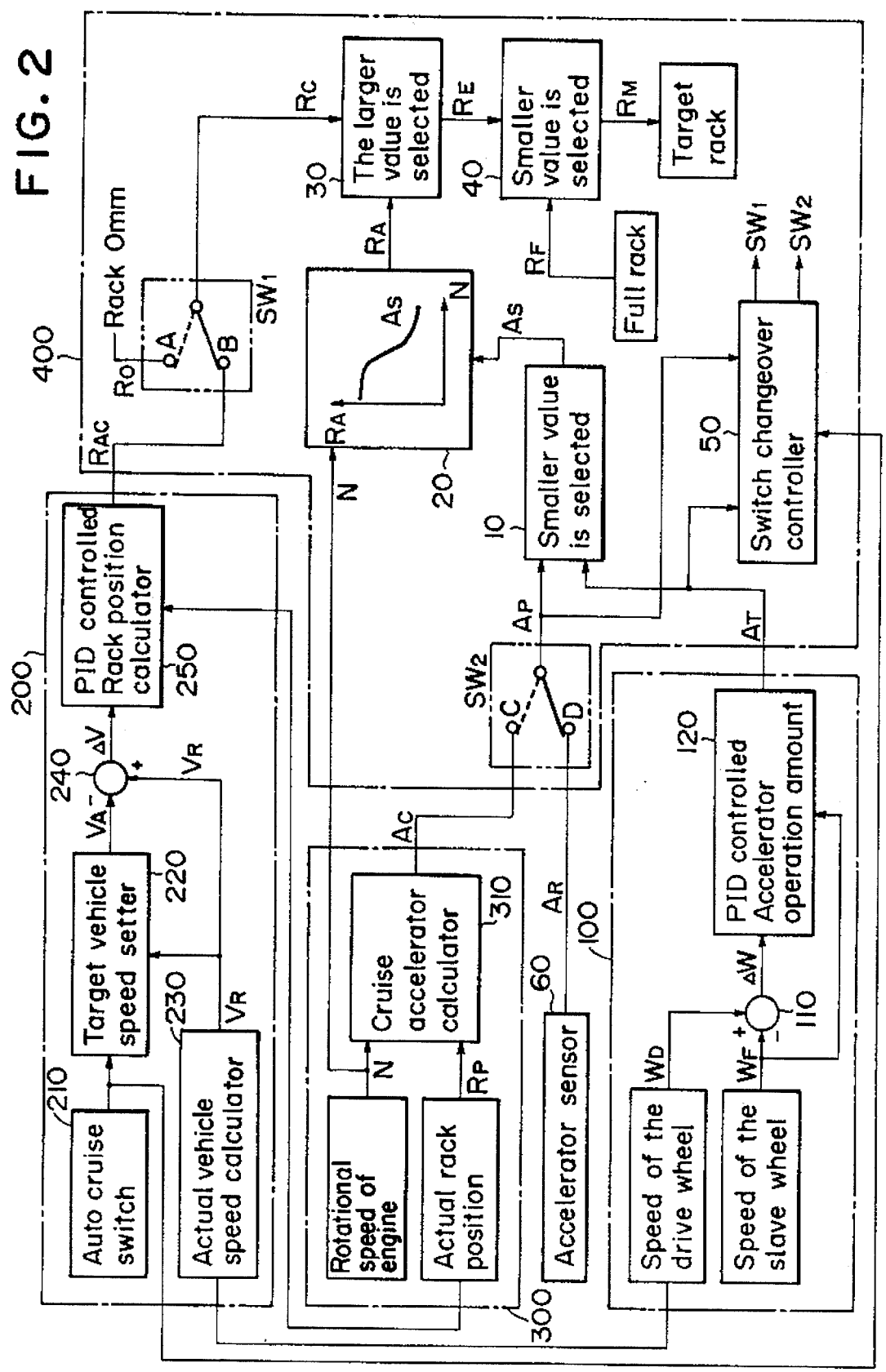
FIG. 2 is a block diagram that illustrates the structure of an embodiment of an engine output control device according to the present invention.

The tractions controller 100, as shown in FIG. 2, calculates the difference Δ W (the amount of slippage) at 110 between the speed of the drive wheel $W_D$ and the speed of the slave wheel $W_F$. It then calculates the amount of accelerator pedal input, which is PID-controlled, that is required to eliminate this amount of slippage ΔW based upon the amount of slippage ΔW and the speed WF of the slave wheel, and sets this as the accelerator limiting signal $A_T$ for traction control.

The auto cruise control system 200, as shown in FIG. 2, consists of an auto cruise switch 210 that sets the operation to auto cruise running, a target vehicle speed setter 220 that sets the actual speed of the vehicle $V_R$ at the time when the auto cruise switch 210 is activated as the target vehicle speed VA, and a calculator 230 for calculating the actual vehicle speed $V_R$ that calculates the actual vehicle speed from the speed of the drive wheel $W_D$. The system calculates the difference in vehicle speed $\Delta V$ between the target vehicle speed $V_A$ and the actual speed of the vehicle $V_R$ at 240, and calculates at 250 the position of the rack, PID-controlled, that is required for eliminating the difference in speed $\Delta V$ and sets this as the target rack position $R_{AC}$ for auto cruise.

The pseudo control accelerator signal calculator 300 in 310 calculates the accelerator signal (cruise accelerator signal) $A_C$ that is pseudo controlled by the current vehicle speed from the rotational speed of the engine N and the actual rack position signal $R_p$. In practice, it creates a 3D map through trial and error from the rotational speed of the engine N, the actual rack position signal $R_p$ and the accelerator signal that corresponds to the accelerator pedal input, and calculates the cruise accelerator signal $A_C$ according to this 3D map. The calculation of the cruise accelerator signal $A_C$ is performed only once, at the moment when the auto cruise control and the traction control are established at the same time, and the results of the calculation are fixed until either the auto cruise control or the traction control is released.

The controller 400 outputs an accelerator signal $A_R$ that corresponds to the accelerator pedal operation; a switch (the first switch) SW2 that selects either the cruise accelerator limiting signal $A_C$ or the accelerator signal $A_R$; a switch (the second switch) SW1 that selects the target rack position signal $R_{AC}$ for auto cruise or the rack position signal $R_0$ with the rack located at 0 mm; a selector (the first selector) 10 that compares the signal selected by the first switch SW2 (the accelerator comparison signal $A_p$) with the accelerator limiting signal $A_T$ and selects the smaller value for the operational accelerator signal $A_S$; a calculator 20 that, using the 3D map, calculates the target rack position signal $R_A$, dependent on acceleration, from the operational accelerator signal $A_S$ selected by the selector 10, the rotational speed of the engine and; a selector (the second selector) 30, that compares the target rack position signal $R_C$, dependent on the auto cruise control selected by SW1, with the target rack position signal $R_A$ dependent on the accelerator, and selects the larger value as the selected target rack position signal $R_E$; a selector (the third selector) 40, that compares the selected target rack position signal $R_E$, selected by the selector 30, with the full rack position signal $R_F$ and selects the smaller value for the final target rack position signal $R_M$; and a switch changeover controller 50 that switches between the switch SW1 and switch SW2.

Figure 3:
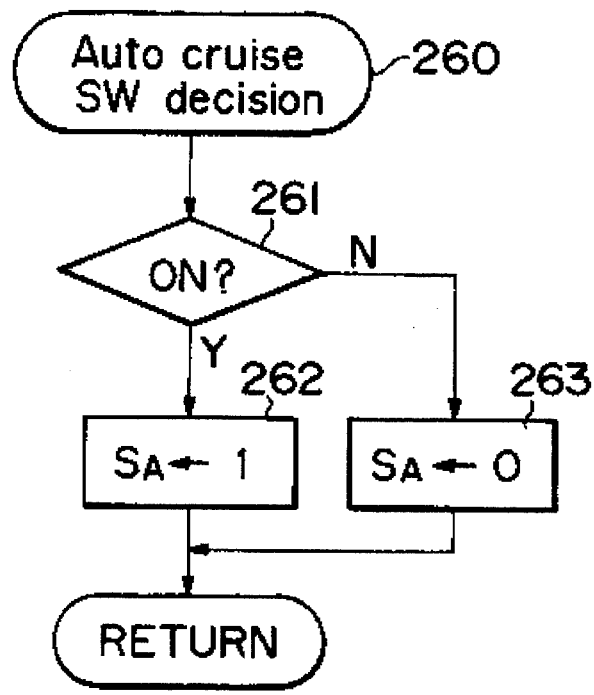
FIG. 3 is a flowchart of the decision making process in the auto cruise switch.
Figure 4:
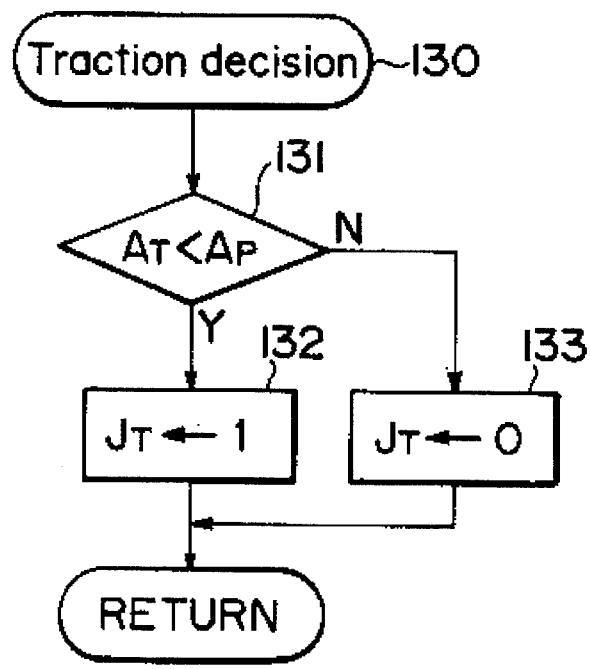
FIG. 4 is a flowchart of the decision making process in the traction control system.
Figure 5:
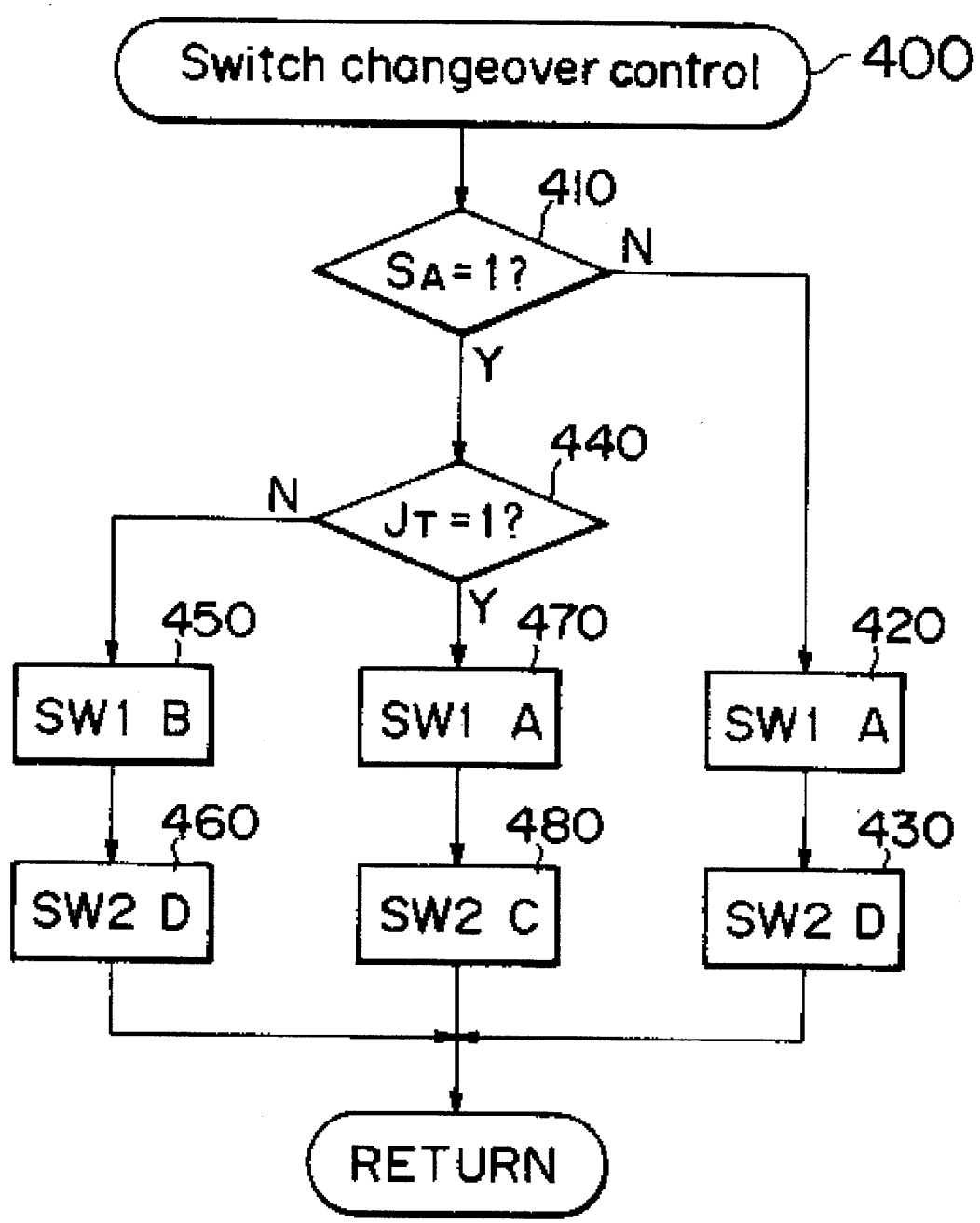
FIG. 5 is a flowchart illustrating the switch control.

The switch changeover controller 50 consists of a decision 260 for the auto cruise switch 210 as shown in the flowchart in FIG. 3; a traction decision 130, which decides whether or not the traction control is being executed as shown in the flowchart in FIG. 4; and a switch changeover control 400, that switches between switch SW1 and switch SW2 depending upon the results of the decision, as shown in the flowchart in FIG. 5.

The decision 260 for the auto cruise switch 210 shown in FIG. 3 decides whether or not the auto cruise switch 210 has been turned on in step 261. If the switch has been turned on (Y), then a "1" is set for the auto cruise control execution signal $S_A$ in step 262. If the switch has not been turned on (N), then a "0" is set for the auto cruise control execution signal $S_A$ in step 263.

The traction decision 130 shown in FIG. 4 compares the accelerator signal $A_p$ with the accelerator limiting signal $A_T$ in step 131. If the accelerator limiting signal $A_T$ has a smaller value (Y), it assumes that the traction control has been executed and a "1" is set for the traction control execution signal $J_T$ in step 132. If the accelerator limiting signal $A_T$ has a value equal to or greater than that for the accelerator signal $A_p$, a "0" is set for the traction control execution signal $J_T$ in step 133.

Based upon those decisions, the switch changeover control 400 shown in FIG. 5 determines whether or not a "1" is set for the auto cruise control execution signal $S_A$ in step 410. During this decision making, if a "1" is not set for the auto cruise control signal $S_A$ (N), it is assumed that the auto cruise control is not being executed and SW1 is switched to contact point A in step 420 and SW2 is switched to contact point D in step 430.

In the aforementioned step 410, if a "1" is set for the auto cruise control execution signal $S_A$ (Y), the operation proceeds to step 440 and a decision is made as to whether or not a "1" is set for the traction control execution signal $J_T$. In this decision, if a "1" is not set for the traction control signal, $J_T$ (N), SW1 is switched to contact point B in step 450 and SW2 is changed over to contact point D in step 460, since only the auto cruise control is executed.

Also, in the decision made in step 440, if a "1" is set for the traction control execution signal $J_T$ (Y), it is assumed that the auto cruise control and the traction control are established at the same time and SW1 is changed over to contact point A in step 470 and SW2 is changed over to contact point C in step 480.

In an engine output control device with the structure described above, engine output control by the accelerator is implemented in the following manner: Since the auto cruise control is not executed, SW1 is set to contact point A side and SW2 is set to contact point D side by the aforementioned switch changeover control. The accelerator signal $A_R$ that corresponds to the operating input on the accelerator pedal, detected by the accelerator sensor 60, becomes the accelerator comparison signal $A_p$ through the switch SW2 (contact point D) and it is compared with the accelerator limiting signal $A_T$ in the selector 10. Normally, when there is no slippage occurring between the drive wheel and the slave wheel, the value for the accelerator signal $A_R$ and the value for the accelerator limiting signal $A_T$ match. In this case, the accelerator signal $A_R$ is selected to be set as the operational accelerator signal $A_S$.

In the calculator 20, the target rack position signal $R_A$, dependent on the accelerator, is calculated based upon the rotational speed of the engine (N) in the characteristics diagram set by this operational accelerator signal $A_S$ and it is compared with the target rack position signal $R_C$, dependent on the auto cruise control, in the selector 30. If the auto cruise control is not being executed, the rack position for the target rack position signal $R_C$, dependent on the auto cruise control, is 0 mm. Therefore, the target rack position signal $R_A$, dependent on the accelerator, is selected to be set as the selected target rack position signal $R_E$.

This selected target rack position signal $R_E$ is compared with the full rack position signal $R_F$ in the selector 40 and the smaller value is set for the final target rack position signal $R_M$. This selection, made by the selector 40, is intended to restrict the upper limit of the selected target rack position signal $R_A$.

With this, since the final target rack position signal $R_M$ is set by the accelerator signal $A_R$ from the accelerator sensor 60, the engine output is controlled by the operating input on the accelerator pedal.

The traction controller 100 is operated if there is slippage occurring between the drive wheel and the slave wheel while the accelerator control is being executed. In this case, the accelerator limiting signal $A_T$ will have a small enough value to ensure that limiting is implemented in the direction of inhibiting the amount of slippage, because the accelerator signal $A_R$ will be larger. This results in the accelerator limiting signal AT, not the accelerator signal $A_R$, being selected by the selector 10. Consequently, a value smaller than that of the accelerator signal $A_R$ is set for the final target rack position signal $R_M$. This reduces the engine output and traction control is thereby executed.

When the auto cruise switch 210 is turned on, the auto cruise control 200 sets the vehicle speed (normally calculated from the speed of the drive wheel) as the target vehicle speed $V_A$ through the target vehicle speed setter 220. The difference $\Delta V$ between this target vehicle speed $V_A$ and the actual speed of the vehicle $V_R$, which is calculated from the speed of the drive wheel, is determined at 240 and the target rack position signal $R_{AC}$ for PID control of the actual rack position signal $R_p$ to reduce the difference $\Delta V$ is calculated.

This target rack position signal $R_{AC}$ is selected with SW1 (at contact point B) which is set by the switch changeover controller 400 when the auto cruise switch 210 is turned on, and is set as the target rack position signal $R_C$, dependent on the auto cruise control, and the larger value is selected by the selector 30. At this point, if auto cruise control is being executed, since the operator is not stepping on the accelerator pedal, the target rack position signal $R_C$, dependent on auto cruise control, is selected. This, in turn, sets the target rack position $R_C$, dependent on auto cruise control, as the selected target rack position signal $R_E$ so that auto cruise control is executed in order to maintain the target vehicle speed $V_A$.

If, during auto cruise execution, the operator steps on the accelerator pedal, engine output control by the accelerator is temporarily in effect, since the target rack position signal $R_A$, dependent on the accelerator, is executed by the selector 30. Auto cruise control is recovered when the accelerator is released.

If traction control is executed during the execution of auto cruise control, i.e., during auto cruise running, and auto cruise control and traction control are thereby established at the same time, SW1 is changed over to contact point A with the switch changeover controller 400 procedure shown in FIG. 5, to release the auto cruise control and, at the same time, SW2 is changed over to contact point C. Thus, the cruise accelerator signal $A_C$, instead of the accelerator signal $A_R$, is set as the accelerator comparison signal $A_p$. With this, the state in which the auto cruise control is being executed by the cruise accelerator signal $A_C$ is maintained and traction control is executed for the accelerator comparison signal $A_p$, which is dependent on the cruise accelerator signal $A_C$. As a result, the condition is achieved in which the auto cruise control is apparently executed continuously during traction control.

If the traction control ends during the auto cruise control described above, SW1 is changed over to contact point B in step 450, SW1 is changed over to contact point D in step 460 to recover auto cruise control because a "0" is set for the traction control execution signal $J_T$ in step 440 as shown in FIG. 5. Thus, normal auto cruise control is executed.

With the structure described above, therefore, it is possible to execute auto cruise control even during the execution of traction control by turning on the auto cruise switch 210.

As has been explained thus far, with the present invention it becomes possible to use the auto cruise control continuously because if traction control is executed due to slipping of the vehicle during auto cruise running, it is dependent on the auto cruise control. In other words, when auto cruise control and traction control are established at the same time, the auto cruise control is released, the cruise accelerator signal, which is controlled by the accelerator signal that sets the vehicle speed during auto cruise running, is calculated and traction control is executed for this cruise accelerator signal. Thus, it appears that traction control is implemented during an auto cruise control run, and as soon as the traction control ends, auto cruise control is recovered. Consequently, it becomes possible to improve the fuel consumption of the vehicle and, at the same time, to ensure a comfortable ride for passengers.

What is claimed is:

1. An engine output control device for a vehicle that controls the engine output by adjusting the position of a rack in a fuel injection system with an accelerator signal that corresponds to an accelerator pedal input, comprising:

a) a traction control means for detecting the amount of slippage of the vehicle and for adjusting the accelerator signal to reduce said amount of slippage;

b) an auto cruise control means for setting a target vehicle speed and for adjusting the position of said rack so that said target vehicle speed can be maintained;

c) a pseudo control accelerator signal calculator means for calculating an auto cruise accelerator signal which is controlled by the accelerator signal during auto cruise control in accordance with at least a rotational speed of the engine and an actual position of the rack; and d) a control means for releasing said auto cruise control means when traction control by said traction control means is established during said auto cruise control by said auto cruise control means, and for executing said traction control in accordance with the auto cruise accelerator signal calculated by said pseudo control accelerator signal calculator means and for then restoring said auto cruise control when the traction control by said traction control means ends.

2. The engine output control device for a vehicle according to claim 1 wherein:

said traction control means calculates the amount of slippage from the difference between a speed of a drive wheel and a speed of a slave wheel, and then calculates an amount of acceleration needed to make the calculated slippage amount equal to zero and outputs an appropriate accelerator control signal in response thereto.

3. The engine output control device for vehicle according to claim 1 wherein:

said auto cruise control means calculates the difference between an actual vehicle speed and said target vehicle speed, and calculates the rack position that makes said calculated vehicle speed difference equal to zero and then outputs the appropriate target rack position signal in response thereto.

4. The engine output control device for a vehicle according to claim 1, wherein:

said pseudo control accelerator signal calculator means calculates said auto cruise accelerator control signal in conformance with a specific 3D map based upon the rotational speed of the engine, on actual position rack signal that corresponds to the actual rack position and the accelerator signal that corresponds to the amount of said accelerator pedal input.

5. The engine output control device for a vehicle according to claim 1 wherein:

said control means comprises a first switch for selecting said accelerator signal or said auto cruise accelerator control signal;

a second switch for selecting the target rack position signal for said auto cruise control or the signal for rack position 0;

a first selection means for comparing an accelerator comparison signal selected by said first switch with the auto cruise accelerator signal calculated by said pseudo control accelerator signal calculator means and for selecting the smaller value as the operational accelerator signal;

a calculation means for calculating the target rack position signal dependent on the accelerator using the operational accelerator signal selected by said first selection means, the rotational speed of the engine and the actual rack position with a specific 3D map;

a second selection means for comparing the target rack position signal, which is dependent on said auto cruise control means and which is selected by said second switch with another target rack position signal which is dependent on the accelerator, and for selecting the larger value of the two compared signals for the selected target rack position signal;

a third selection means for comparing the selected target rack position signal selected by said second selection means with the full rack position signal and for selecting the smaller value of the two compared signals for the final target rack position signal, and;

a switch changeover means for switching between outputs of said first switch and said second switch.

* * * * *